United States Patent [19]

Hamada et al.

[11] Patent Number: 4,477,520

[45] Date of Patent: Oct. 16, 1984

[54] MAGNETIC RECORDING MEDIA HAVING LUBRICATED CONTACT LAYER

[75] Inventors: Mitsuru Hamada, Yokohama; Toshio Kumai, Chofu; Shoji Ishida, Hatano, all of Japan

[73] Assignee: Fujitsu Limited, Kawasaki, Japan

[21] Appl. No.: 293,626

[22] PCT Filed: Dec. 23, 1980

[86] PCT No.: PCT/JP80/00321

§ 371 Date: Aug. 12, 1981

§ 102(e) Date: Aug. 12, 1981

[87] PCT Pub. No.: WO81/01904

PCT Pub. Date: Jul. 9, 1981

[30] Foreign Application Priority Data

Dec. 24, 1979 [JP]  Japan ................. 54-166949

[51] Int. Cl.$^3$ ................................ G11B 5/72
[52] U.S. Cl. ................... 428/336; 428/208;
   428/209; 428/411; 428/522; 428/694; 428/693;
   428/900; 427/131; 427/128; 360/134; 360/135;
   360/136; 252/62.54
[58] Field of Search ........... 428/694, 695, 900, 336,
   428/208, 209, 411, 522; 427/131, 128;
   360/134–136; 252/62.54

[56] References Cited

U.S. PATENT DOCUMENTS

| 3,523,086 | 8/1970 | Bisschops et al. | 428/425.9 |
| 3,778,308 | 12/1973 | Roller et al. | 428/421 |
| 4,046,932 | 9/1977 | Hartmann | 428/900 |
| 4,267,238 | 5/1981 | Chernega | 428/480 |
| 4,309,482 | 1/1982 | Suzuki et al. | 428/695 |
| 4,327,139 | 4/1982 | Schaefer | 428/695 |
| 4,390,601 | 6/1983 | Ono | 428/695 |

FOREIGN PATENT DOCUMENTS

| 50-3309 | 1/1975 | Japan . | |
| 51-123112 | 10/1976 | Japan . | |
| 53-79502 | 7/1978 | Japan . | |
| 54-9243 | 9/1979 | Japan | 428/900 |
| 54-137302 | 10/1979 | Japan | 252/62.54 |
| 54-147815 | 11/1979 | Japan | 428/900 |
| 56-159840 | 12/1981 | Japan | 427/131 |
| 820931 | 9/1959 | United Kingdom | 252/62.54 |

Primary Examiner—Ellis P. Robinson
Attorney, Agent, or Firm—Staas & Halsey

[57]  ABSTRACT

Magnetic recording media comprise a lubricated magnetic recording layer formed on at least one side of a permanent substrate. The magnetic recording layer comprises a contact layer of a polymer material which contains polyvinyl alkyl ether in an amount of from 5 to 30% by weight, based on the total weight of the polymer material, which is impregnated with a lubricant so as to improve the wear durability of the magnetic recording media.

19 Claims, No Drawings

MAGNETIC RECORDING MEDIA HAVING LUBRICATED CONTACT LAYER

BACKGROUND OF THE INVENTION

The present invention relates to magnetic recording media, particularly magnetic recording media having a lubricated contact layer for the purpose of improving wear characteristics.

THE PRIOR ART

Magnetic recording media are used in various forms, e.g., discs, tapes, drums and cards. Generally, such magnetic recording media comprise a permanent substrate and a magnetic recording layer formed on at least one side of the substrate. A substrate may be a disc of metal, e.g., aluminum or a film of plastic, e.g., linear polyester. A magnetic recording layer may be a magnetically continuous film which is formed of a ferromagnetic material sputtered or plated on the substrate or a magnetically discontinuous film obtained by coating the substrate with a so-called magnetic paint, drying and, then, curing the paint film. In such a magnetically discontinuous film ferromagnetic particles such as iron oxide are dispersed in a binder, such as a polymer material.

Among the ferromagnetic materials, $\gamma$-$Fe_2O_3$ is most frequently used. However, other material, such as Co-$\gamma$-$Fe_2O_3$, $CrO_2$, Fe or Fe—Co may be used. The binder polymer material may be a thermosetting resin, e.g., an acrylic, an epoxy, a phenolic or a melamine resin or a thermoplastic resin, e.g., a polyvinyl buthyral or a polyvinyl acetate resin.

These magnetic recording media are utilized in conjunction with magnetic recording heads or transducers to produce the desired reading or writing properties. In order to obtain a higher recording density, it is necessary for the magnetic recording layer to be thinner and/or for the magnetic head to float over the magnetic recording layer with a narrower gap therebetween. However, a thin magnetic recording layer reduces its mechanical strength and a narrow gap between the magnetic head and the recording layer increases the probability of their contact. Once the heads clash against the surface of the magnetic recording media the magnetic recording layers are apt to be damaged, and, thereby, the recorded information will be destroyed.

Recently, a monolithic head was developed by consolidating a magnetic core and a slider in order to decrease the floating height, i.e., the above-mentioned gap. However, this monolithic head has to suffer from sliding contact with the magnetic recording layer at the time of start and stop. This loading method is called "Contact Start and Stop" method. When the magnetic recording disc stands still, the monolithic head rests on the disc. As the disc begins to rotate, the head gradually floats up aerodynamically over the disc. Thus, the head contacts with the surface of the rotating disc, before the disc obtains certain rotations per minute, where an aerodynamic force necessary for floating up is effected. Again, the head and the disc contact each other, as the disc begins to cease its rotation.

Therefore, the head and the disc cannot avoid frictional resistance at the start and stop of their operation. Consequently, the magnetic recording layer easily wears because of the frictional resistance, unless the contact layer thereof sufficiently can be lubricated.

SUMMARY OF THE INVENTION

It is an object of the present invention to provide magnetic recording media having a wear-resistant magnetic recording layer.

It is another object of the present invention to provide durable magnetic recording media.

It is still another object of the present invention to provide a magnetic disc which can be used in the so-called "Contact Start and Stop" method.

Other objects and advantages of the present invention will further become apparent from the following description of the present invention.

DETAILED DESCRIPTION OF THE PREFERRED EMBODIMENT

According to the present invention, there are provided magnetic recording media comprising a permanent substrate and a magnetic recording layer formed on at least one side of said substrate, said magnetic recording layer comprising a contact layer of a polymer material which contains polyvinyl alkyl ether in an amount of from 5 to 30% by weight, based on the total weight of said polymer material, said polymer material being impregnated with a lubricant.

Polyvinyl alkyl ether may be represented by the following general formula:

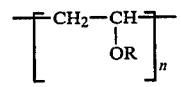

wherein R is an alkyl group and n is the degree of polymerization. It is preferable that R is a low alkyl group, particularly a methyl group. Such a polyvinyl alkyl ether may be any one selected from polyvinyl methyl ether, polyvinyl ethyl ether and polyvinyl isobutyl ether which are commercially available from BASF A. G. under the trade names "Lutonal M 40", "Lutonal A 50" and "Lutonal I 65", respectively.

The polymer material according to the present invention contains from 5 to 30% by weight of polyvinyl alkyl ether, based on the total weight of the polymer material, whereas the remainder of the components may be a thermosetting resin, such as a phenolic, an epoxy, an acrylic or a melamine resin, or a thermoplastic resin, such as a polyvinyl butyral or a polyvinyl acetate resin or a mixture thereof. A thermosetting resin is preferable in view of its mechanical strength, although a thermoplastic resin may be also used. If the content of polyvinyl alkyl ether is less than the lower limit, the impregnating ability for a lubricant is not sufficient. The upper limit is not strictly critical, however, as the content of polyvinyl alkyl ether increases up to and above the upper limit, the strength of the polymer material deteriorates, although the impregnating ability for a lubricant is improved. Therefore, the content of polyvinyl alkyl ether is preferably not more than about 30% by weight, based on the total weight of the polymer material.

Any lubricant, such as fluorocarbon or silicone, may be used for lubricating the polymer material. A preferable lubricant is a fluorocarbon, particularly perfluoroalkylpolyether, because it impregnates easily a polymer material containing polyvinyl alkyl ether.

BEST MODE FOR CARRYING OUT THE INVENTION

A magnetic recording layer may be a magnetically discontinuous film which comprises ferromagnetic particles dispersed in a binder polymer material.

A preferred embodiment of the present invention may be magnetic recording media having a magnetic recording layer which comprises ferromagnetic particles in an amount of from 45 to 85% by weight dispersed in a binder polymer material in an amount of from 15 to 55% by weight, both based on the weight of said magnetic recording layer. The binder polymer material in accordance with the present invention contains polyvinyl alkyl ether in an amount of from 5 to 30% by weight, based on the total weight of said polymer material, said polymer material being impregnated with a lubricant.

The amount of ferromagnetic particles contained in such a magnetic recording layer, i.e., the so-called Pigment Weight Concentration may vary in the range of from 45 to 85% by weight, based on the weight of the layer. For example, a magnetic recording disc may contain about from 50 to 65% by weight of ferromagnetic particles, while a magnetic recording tape may contain usually about from 70 to 80% by weight thereof, based on the weight of the recording layer.

A magnetic recording layer may be a magnetically continuous film formed by sputtering or plating a ferromagnetic material on the permanent substrate. In this case, a polymer material which contains polyvinyl alkyl ether may coat the magnetically continuous film so as to form a contact layer.

Thus, another preferred embodiment of the present invention may be magnetic recording media having a composite magnetic recording layer which consists of a magnetically continuous film which is formed of a ferromagnetic material sputtered or plated on a substrate and a coating film which is formed of a polymer material on said magnetically continuous film. The polymer material in accordance with the present invention contains polyvinyl alkyl ether in an amount of from 5 to 30% by weight, based on the total weight of said polymer material, said polymer material being impregnated with a lubricant.

It is convenient that the thickness of said coating film is in the range of from 100 to 1000 Å.

Furthermore, a magnetic recording media as an embodiment of the present invention may comprise a polymer coat containing polyvinyl alkyl ether and impregnated with a lubricant, on a conventional magnetic recording medium which is produced without using polyvinyl alkyl ether as a part of the binder polymer or the coat polymer.

EXAMPLE 1

Various magnetic paints were prepared. One of them was a conventional magnetic paint, which did not contain polyvinyl alkyl ether, and the components of which are shown in parts by weight in Table I, below.

TABLE I

| | |
|---|---|
| $\gamma$-Fe$_2$O$_3$ particles | 55.0 |
| Acrylic resin* | 22.5 |
| Epoxy resin** | 13.5 |
| phenolic resin*** | 9.0 |
| toluene-xylene (1.1 by volume) mixture | 300 |
| cellosolve acetate | 50 |

TABLE I-continued

| | |
|---|---|
| benzyl alcohol | 50 |

*Mitsubishi Rayon Co., Duracron SE 5377
**Shell Chemicals Co., Epikote Ep 1001
***Showa Union Gosei Co., Bakelite BKR 2620

These components were blended in a ball mill in order to prepare a reference magnetic paint. The magnetic paint was applied by spin coating on an aluminum disc of 14 inches in diameter so as to form a film of about 1 $\mu$m in thickness. The applied paint was dried at room temperature, and cured by heating at 200° C. for 30 minutes, then, at 230° C. for 30 minutes. The applied magnetic paint was subjected to a magnetic field which oriented the magnetic particles $\gamma$-Fe$_2$O$_3$ in the circumferencial direction of the disc during the operation of spin coating and drying. Finally, the cured magnetic layer was polished to a thickness of about 0.8 $\mu$m.

Magnetic paints M, A and I were prepared by adding to the components shown in Table I, 10 parts by weight of polyvinyl methyl ether, polyvinyl ethyl ether and polyvinyl isobutyl ether, respectively, which are commercially available under the trade names "Lutonal M 40", "Lutonal A 50" and "Lutonal I 65", respectively. Then, magnetic recording discs M, A and I were produced by applying the abovementioned magnetic paints in a similar manner as the abovementioned reference specimen. Perfluoroalkylpolyether, commercially available under the trade name "Krytox 143 CZ" from E. I. duPont de Nemours Co., was used to determine the impregnating ability of a lubricant into the cured magnetic paint film. Lubricant solutions of various concentrations were prepared by diluting perfluoroalkylpolyether in trichlorotrifluoroethane. Three $\mu$l of a lubricant solution of known concentration was dropped by means of a microsyringe on the surface of the cured magnetic film on the aluminum disc. Then, the disc was heated at 230° C. for 30 minutes.

The "saturated concentration" of a lubricant was determined by estimating the upper limit of the concentration of a lubricant solution at which no trace of the lubricant was detected on the heated surface of the cured magnetic paint film. The estimated saturated concentrations are shown in Table II, below.

TABLE II

| Magnetic Paint Film | Saturated Concentration (wt. %) |
|---|---|
| Reference | 0.2 |
| M | 2.5 |
| A | 0.5 |
| I | 0.5 |

As shown in Table II, a magnetic paint film containing polyvinyl alkyl ether, particularly polyvinyl methyl ether was found to exhibit the most improved impregnating ability for a lubricant.

EXAMPLE 2

Preparation of the magnetic paint films and estimation of their saturated concentration were carried out in a similar manner as described in Example 1, except that polyvinyl methyl ether was added in 2.5, 5.0 and 7.5 parts by weight, respectively.

The thus prepared magnetic paint films and those containing polyvinyl methyl ether in an amount of 0 and 10 parts by weight, respectively, were impregnated with the lubricant "Krytox 143 CZ" and their wear durability was determined as follows. An IBM type 3340 magnetic head was loaded by a 100 g weight and contacted with the magnetic paint film on the aluminum disc which rotated at 500 r.p.m. The wearing rate of the magnetic paint film was measured and the estimated wear durability measured in grades from 1 to 5, as shown in Table III.

TABLE III

| Wearing Rates (μm/min.) | Grades of Wear Durability |
| --- | --- |
| <0.01 | 5 |
| 0.01 ~ 0.02 | 4 |
| 0.02 ~ 0.03 | 3 |
| 0.03 ~ 0.1 | 2 |
| >0.1 | 1 |

The resulting grades of wear durability for the magnetic paint films are shown in Table IV, below.

TABLE IV

| Polyvinyl methyl ether | | Saturated concentration of lubricant (wt. %) | Grade of wear durability |
| --- | --- | --- | --- |
| (Wt. parts added to composition, table I) | (wt. % in binder of magnetic layer) | | |
| 0 | 0 | 0.2 | 1 |
| 2.5 | 5.3 | 0.5 | 3 |
| 5.0 | 10.0 | 1.5 | 4 |
| 7.5 | 14.3 | 2.0 | 5 |
| 10.0 | 18.2 | 2.5 | 5 |

A magnetic layer usually exhibits a wear durability of more than 30,000 cycles of Contact Start and Stop, when the grade of wear durability is not less than 3. Therefore, as can be seen from Table IV, when the content of the polyvinyl methyl ether is 5.3% by weight and the saturated concentration of the lubricant is 0.5% by weight, the grade of wear durability is 3, which reveals that the wearing rate of the magnetic recording media is successfully improved.

EXAMPLE 3

Solutions containing a mixture of a phenolic resin "BKR 2620" and polyvinyl methyl ether "Lutonal M 40" in various percentages by weight were applied on a layer of $\gamma$-$Fe_2O_3$ sputtered on a disc 14 inches in diameter, dried and cured by heating at 200° C. for 30 minutes. The cured polymer coats exhibited about 500 Å in thickness. The impregnating ability of the cured polymer coats for the lubricant, perfluoroalkylpolyether ("Krytox 143 CZ") solution in trichlorotrifluoroethane was determined in a similar manner as described in Example 1. The wear durability of the polymer coats were estimated as described in Example 2.

TABLE V

| Polyvinyl methyl ether (wt. % in the polymer) | Saturated concentration (wt. %) | Grade of wear durability |
| --- | --- | --- |
| 0 | <0.05 | 1 |
| 3 | 0.2 | 1 |
| 5 | 0.4 | 3 |
| 9 | 0.5 | 3 |
| 15 | 0.7 | 3 |
| 27 | 0.9 | 4 |
| 35 | 1.0 | 4 |

As can be seen from Table V, when the content of the polyvinyl methyl ether is 5% by weight and the amount of impregnated lubricant is 0.4% by weight, the grade of wear durability is 3, which reveals that the wearing rate of the magnetic recording media is successfully improved.

We claim:

1. A magnetic recording medium comprising a permanent substrate and a magnetic recording layer formed on at least one side of said substrate, said magnetic recording layer comprising a contact layer which includes a polymer material comprising as a major component an acryl resin and polyvinyl alkyl ether in an amount of from 5 to 30% by weight, based on the total weight of said polymer material, said polymer material being impregnated with a lubricant at least at the external surface of said magnetic recording layer.

2. The medium of claim 1, wherein said magnetic recording layer is a magnetically discontinuous layer comprising ferromagnetic particles in an amount of from 45 to 85% by weight dispersed in a binder type of said polymer material in an amount of from 15 to 55% by weight, based on the total weight of said magnetic recording layer.

3. A magnetic recording medium comprising a permanent substrate and a magnetic recording layer on at least one side of said substrate, wherein said magnetic recording layer is a composite layer comprising a magnetically continuous film formed of a ferromagnetic material on said substrate and a coating film of a polymer material on said magnetically continuous film, said polymer material containing polyvinyl akyl ether in an amount of from 5 to 30% of the total weight of said polymer material, and said polymer material being impregnated with a lubricant at least at the external surface of said coating film.

4. The medium of claim 3, wherein the thickness of said coating film is in the range of from 100 to 1000 Å.

5. The medium of claim 1, 2, 3 or 4, wherein said polyvinyl alkyl ether is polyvinyl methyl ether, polyvinyl ethyl ether or polyvinyl isobutyl ether.

6. The medium of claim 1, 2, 3 or 4, wherein said lubricant is a fluorocarbon or silicone lubricant.

7. The medium of claim 6, wherein said lubricant is perfluoroalkylpolyether.

8. The medium of claim 1, 2, 3 or 4, said polyvinyl alkylether being represented by

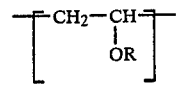

wherein R is a low alkyl group.

9. The medium of claim 5, wherein said lubricant is a fluorocarbon or silicone lubricant.

10. The medium of claim 5, wherein said lubricant is perfluoroalkylpolyether.

11. A magnetic recording medium, comprising a substrte and a magnetic recording layer on at least one side of said substrate, a contact layer formed on each said magnetic recording layer, each said contact layer being of a polymer material comprising as a major component an acryl resin and 5 to 30% by weight of polyvinyl alkyl ether, said polymer material being impregnated with a lubricant.

12. The medium of claim 11, said magnetic recording layer including a magnetically continuous recording layer formed on said substrate beneath each said contact layer.

13. A magnetic recording medium, comprising a substrate and a magnetic recording layer on at least one side of said substrate, said magnetic recording layer including a binder polymer material comprising as a major component an acryl resin and 5 to 30% by weight of polyvinyl alkyl ether, said binder polymer material being impregnated with a lubricant.

14. The medium of claim 13, said magnetic recording layer comprising a magnetically discontinuous layer.

15. The medium of claim 12 or 14, wherein said polyvinyl alkyl ether is polyvinyl methyl ether, polyvinyl ethyl ether or polyvinyl isobutyl ether.

16. The medium of claim 12 or 14, wherein said lubricant is perfluoroalkylpolyether.

17. The medium of claim 1, 2, 3 or 4, wherein the properties of said magnetic recording layer correspond to said magnetic recording layer being formed before said polymer material is impregnated with said lubricant, said properties including the adhesion of the layer containing the polyvinyl alkyl ether to the respective underlying surface of the magnetic recording medium, and the amount of lubricant that is available at the upper surface of the magnetic recording medium.

18. The medium of claim 7, wherein the properties of said magnetic recording layer correspond to said magnetic recording layer being formed before said polymer material is impregnated with said lubricant, said properties including the adhesion of the layer containing the polyvinyl alkyl ether to the respective underlying surface of the magnetic recording mediumr, and the amount of lubricant that is available at the upper surface of the magnetic recording medium.

19. The medium of claim 17, wherein said lubricant has a saturated concentration of at least 0.4%.

* * * * *